United States Patent [19]

Rogers

[11] Patent Number: 4,669,589
[45] Date of Patent: Jun. 2, 1987

[54] DECOUPLING ARRANGEMENT BETWEEN DRIVE SOURCE AND POWER TRAIN

[75] Inventor: Edward J. Rogers, Chicago, Ill.

[73] Assignee: S&C Electric Company, Chicago, Ill.

[21] Appl. No.: 771,398

[22] Filed: Aug. 30, 1985

[51] Int. Cl.⁴ .......................... F16D 11/00; F16B 1/00
[52] U.S. Cl. ........................................ 192/14; 192/65; 192/108; 192/114 R; 403/19; 403/354
[58] Field of Search ................... 192/14, 16, 65, 33 R, 192/108, 114 R, 67 P; 403/354, 355, 19; 70/180, 182, 189, 188; 335/74, 77

[56] References Cited

U.S. PATENT DOCUMENTS

| Re. 15,542 | 2/1923 | Thiell | 192/114 |
| 927,308 | 7/1909 | Wilton | 70/180 |
| 1,074,959 | 10/1913 | Kreiling | 192/114 X |
| 1,146,446 | 7/1915 | Pongrat | 70/180 X |
| 1,217,802 | 2/1917 | Mattice | 70/189 X |
| 1,704,433 | 3/1929 | Harris | 192/67 P |
| 1,913,046 | 6/1933 | Callan | 192/108 X |
| 2,844,021 | 7/1958 | Bryant | 70/188 X |
| 3,508,179 | 4/1970 | Bernatt et al. | 335/68 |
| 3,766,794 | 10/1973 | Wilcox | 192/67 P X |
| 3,869,030 | 3/1975 | Masaki | 192/114 R X |
| 4,107,486 | 8/1978 | Evans | 200/48 R |
| 4,190,755 | 2/1980 | Rogers | 200/334 |
| 4,351,994 | 9/1982 | Evans et al. | 200/153 |
| 4,466,520 | 8/1984 | Herman | 192/33 R X |

OTHER PUBLICATIONS

"S&C Switch Operator—Moto-Draulic Type", S&C Electric Company Photo Sheet 740-4.1, Sep. 23, 1986, 2 pages.

"Switch Operating Mechanism", H. K. Porter, Catalog No. 1-160, Apr., 1971, 4 pages.

"MO-10 Motor Operator", I-T-E Imperial Corporation, Catalog Section 13.4.1.1–13.4.1.2, Aug. 30, 1986, 5 pages.

"Type CM-4A Motor Operating Mechanism", Siemens-Allis Brochure DS 4.2, Jun., 1983, 8 pages.

Primary Examiner—Rodney H. Bonck
Attorney, Agent, or Firm—James V. Lapacek

[57] ABSTRACT

A decoupling arrangement that includes a manually operable latch member is provided between an output shaft of a drive source and a power train. In a first coupled position, the latch member cooperates with slots in a tubular member that is arranged to be rotated by the drive source. A driven member is arranged coaxially with the tubular member and pivotally carries the latch member. To accomplish decoupling, the latch member is pivoted out of the coupled position. The decoupling arrangement includes provisions to prevent decoupling movement of the latch member except when the power train is at one or at one of a plurality of predetermined operative positions. The decoupling-preventing provision also serves to restrain the power train against movement when the latch member is moved out of the coupled position. In a preferred arrangement, the driven member and the tubular member each include two diametrically opposed slots and the latch member in the coupled position is received by the aligned slots thereby assuring coupling only in the predetermined synchronized relationship of the tubular member and the driven member.

10 Claims, 4 Drawing Figures

DECOUPLING ARRANGEMENT BETWEEN DRIVE SOURCE AND POWER TRAIN

CROSS-REFERENCE TO RELATED APPLICATIONS

This application is directed to a decoupling arrangement which is suitable for use with the operator and the circuit protection device configurations disclosed and claimed in commonly-assigned, co-pending application Ser. Nos. 726,862 filed on Apr. 25, 1985 in the names of J. Ramos et. al. and 721,614 filed on Apr. 10, 1985 in the names of L. V. Chabala et. al. which are hereby incorporated by reference.

BACKGROUND OF THE INVENTION

1. Field of the Invention

The present invention relates generally to the field of power trains and more particularly to a decoupling arrangement between a drive source and a power train.

2. Description of the Related Art

Various arrangements are known for driving a power train from a drive source that provide for decoupling of the power train from the drive source. For example, such arrangements are disclosed in U.S. Pat. Nos. 3,508,179, 4,107,486, 4,190,755 and 4,351,994, and Moto-Draulic switch operator illustrated in S&C Electric Company Photo Sheet No. 740-4.1 (Sept. 23, 1968), the Delta-Star switch operating mechanism illustrated in the H. K. Porter Catalog, reference Catalog No. 1-160 (April, 1971), the MO-10 Motor Operator illustrated in the I-T-E Imperial Corporation Catalog Section 13.4.1.1-13.4.1.2 (Aug. 30, 1968), and the CM-4A motor operating mechanism illustrated in Siemens-Allis Brochure DS4.2 (June, 1983).

As illustrated in FIG. 1 of U.S. Pat. No. 3,508,179, a switch drive shaft 29 of the power train is connected by a shaft coupler and bearing assembly indicated generally at 30 to a switch operating mechanism indicated generally at 31. Specifically, a selector handle 38 (FIGS. 1, 2 and 12) operates a clutch 45 (FIG. 2) to disconnect the shaft extension 43 (FIGS. 2 and 5) of the switch drive shaft (power train) 29 from the output shaft 48 (FIG. 5) of the drive source. As seen in FIG. 5 of that patent, the lower end of the shaft extension 43 receives a clutch-driven member 44. A transverse slot 46 is provided in the lower end of the clutch-driven member 44 for receiving a coupling bar 47 that is secured to the upper end of the output shaft 48. The switch drive shaft 29 of the power train is capable of being recoupled to the switch operating mechanism 31 in only one position of annular alignment of the transverse slot 46 and the coupling bar 47 as shown by indicators operated individually from the switch drive shaft and the motor of the drive source. The arrangement in U.S. Pat. No. 4,107,486 is similar to that of U.S. Pat. No. 3,508,179. As seen in FIG. 19 of U.S. Pat. No. 4,107,486, a coupling 74 includes a slot 78 for receiving a coupling bar 80 on the end of a shaft. 82. Similarly to U.S. Pat. No. 3,508,179, the coupling/decoupling arrangement is operable via the selector handle 38. Additionally, operation of the selector handle 38 to the decoupled position also locks the switch drive shaft of the power train. The motor of the drive source is held inoperable while the switch drive shaft is being decoupled and locked.

U.S. Pat. No. 4,190,755 provides for the uncoupling of a switch operating mechanism from the drive linkage or power train of a switch as the switch operating mechanism is withdrawn from an enclosure. Referring to FIGS. 2 and 8 of that patent, a coupling member 106 is fixedly carried by a drive shaft 108 of the drive linkage (power train) 30 of the switch. The switch operating mechanism includes an output shaft 115 that carries an output coupling member 114. The output coupling member 114 rigidly carries a coupling pin 116. The coupling pin 116 is received within two notches 105 and 107 of the coupling member 106 when the switch operating mechanism is inserted to the coupled position. Upon rotation of the output shaft 115, the drive linkage 30 is driven by engagement of the coupling pin 116 in the notches 105 and 107 of the coupling member 106. When the switch operating mechanism is uncoupled from the drive linkage 30, movement of the switch is inhibited by a locking mechanism.

Considering U.S. Pat. No. 4,351,994, a decoupling arrangement is provided for switchgear as shown in FIGS. 1, 15 and 16B of that patent to decouple the operating mechanism from the switch. Specifically, a coupling bolt 578 is carried by strut-driving shaft 568 via threaded engagement of the coupling bolt 578 in a threaded hole 584 formed through the strut-driving shaft 568. The coupling bolt 578 includes a conical head 580. In the coupled position, the conical head 580 is firmly maintained within a hole 576 of a drive lever 200. The coupling bolt 578 includes a blind bore containing a spring-biased plunger 636. The coupling bolt 578 is accessible for engagement by a tool 653 through a compartment 652. The tool 653 is inserted to depress the plunger 636 and to rotate the coupling bolt 578. To accomplish decoupling, rotation of the coupling bolt 578 via the tool 653 in one direction moves the coupling bolt 578 away from the drive lever 200 with the conical head 580 being withdrawn from the tapered hole 576 of the drive lever 200. The strut-driving shaft 568 is locked upon withdrawal of the coupling bolt 578 to prevent movement of the switch blades. Decoupling is prevented except when the switch is in either the fully-open or fully-closed position. For this purpose, holes 664 and 666 (FIGS. 15 and 17A) are located in a back plate 658 for passage of the tool 653 such that the coupling bolt 578 is aligned with one of the respective holes 664,666 for access by the tool 653 when the switch is in one of the corresponding fully-open or fully-closed positions. The Moto-Draulic switch operator is similar to the arrangement in U.S. Pat. No. 4,351,994 and includes a clutch screw that is carried by a crank of the power train. The clutch screw is moved into and out of engagement with a driving arm connected to the drive source to accomplish coupling and decoupling. Upon withdrawal of the clutch screw to accomplish decoupling, the clutch screw is received within a hole to lock the power train against movement. ]

The Delta-Star switch operating mechanism includes a hollow coupling member carried by the power train that is slidably moved over an extending shaft from the drive source of the operating mechanism. The extending shaft includes a protruding member that interfits within a receiving portion extending from the hollow coupling member to provide coupling of the extending shaft and the power train. The receiving portion extends radially from the hollow coupling member and the protruding member extends radially from the extending shaft. A locking plate is provided to define an alignment surface such that the hollow coupling member can be retained in a decoupled position only when the hollow coupling member is at a predetermined rotary position so as to align an extending flange with the locking plate. When the hollow coupling member has been decoupled and raised to bring the extending flange above the locking plate, the shackle of a lock is placed through holes in the extending flange of the hollow coupling member to lock the power train in the decoupled position.

The I-T-E MO-10 motor operator includes a coupling assembly (FIG. 2) to provide decoupling of a fixed coupling driven by the drive source from a pipe coupling carried by the power train. The two couplings are joined by a latch bar (uncoupling bar in FIG. 2) that is pivotally carried by the pipe coupling. The latch bar in the coupled position is positioned into a notch provided on the fixed coupling so that rotation of the fixed coupling is imparted to the pipe coupling via the latch bar. The latch bar is pinned in the coupling position via insertion of a pin through holes in the pipe coupling and the latch bar. A padlock is inserted through the pin. To accomplish decoupling, the pin is removed and the latch bar is disengaged from the fixed coupling. The latch bar is pivoted through an open or closed indicator member and retained by insertion of the pin through the latch bar. The shackle of a padlock is inserted through the pin.

The CM-4A motor operating mechanism in FIGS. 7 and 8 of the DS4.2 brochure provides for decoupling of the switch from the motor operator by the pivoting of a lever carried on the power train. In the coupled position, a pin carried by the lever engages a slot that is milled off center in the vertical output shaft. When the lever is pivoted to accomplish decoupling, the pin is lifted out of the slot. The lever is pivoted by insertion of a pipe in a socket that is provided on the lever. The power train and the lever include holes for passage of a lock shackle to lock the lever in the coupled position. Similarly, the lever and the protruding member of motor operating mechanism also include holes for the passage of a lock shackle to lock the power train in fixed, decoupled positions corresponding to opened and closed positions.

While these arrangements are generally suitable for their intended purposes, it is always desirable to provide a decoupling arrangement having simplified construction and operation that effectively transmits movement of the drive source to the power train in the coupled position and that provides improved structural features for permitting decoupling only at a predetermined position of the power train while restraining the power train against movement in the decoupled position. For example, the decoupling arrangements of U.S. Pat. Nos. 3,508,179 and 4,107,486 utilize a selector handle 38 that is remote from the remainder of the decoupling arrangement and that is connected to the power train via a number of interconnected parts. That arrangement also utilizes a brake mechanism additional to the decoupling arrangement for restraining movement of the power train in the decoupled position. Accordingly, it would be desirable to eliminate the remote location of the selector handle, the parts interconnecting the selector handle, and the additional brake mechanism. Considering the decoupling arrangement of U.S. Pat. Nos. 4,351,994 and the Moto-Draulic switch operator, it would be desirable to simplify the decoupling operation regarding the alignment of an appropriate tool and the unthreading of a bolt. It would also be desirable to reduce the decoupling time. In addition to the convenience of a faster decoupling arrangement, a rapid-acting, simple-to-operate decoupling arrangement also avoids the problem of being in a partially-decoupled phase when an operator is activated remotely. As to the decoupling arrangements of U.S. Pat. No. 4,190,755 and the Delta Star switch operating mechanism, it would be desirable to provide a decoupling arrangement that does not require axial movement of one or more portions of the power train or drive source connections. Although the decoupling arrangements of the Siemens-Allis Type CM-4A motor operating mechanism and the I-T-E Imperial Corporation MO-10 motor operator provide generally compact structures that are relatively simple to operate, it would be desirable to provide a decoupling arrangement that does not require a pin separate from the pivotal coupling bar as in the MO-10 motor operator and that is simpler to operate and provides a more direct indication of the coupling mode than the Siemens-Allis CM-4A motor operating mechanism. Further, the Delta Star switch operating mechanism, the CM-4A motor operating mechanism and the MO-10 motor operator are each capable of being decoupled at any position which can lead to various undesirable results.

SUMMARY OF THE INVENTION

Accordingly, it is a principal object of the present invention to provide a decoupling arrangement that operates between an output shaft of a drive source and a power train and that includes a latch member that is directly operable between coupled and decoupled positions; a tubular member being arranged to be rotated by the drive source and including slots for receiving the latch member when the latch member is in the coupled position, a driven member being arranged coaxially with the tubular member, and the latch member being pivotally mounted with respect to the driven member.

It is another object of the present invention to provide a decoupling arrangement that operates between a power train and an output shaft of a drive source and that includes a manually operable latch member that is effective to permit decoupling only when the power train is in a predetermined operative position and to simultaneously restrain the power train from movement when the latch member is operated for decoupling.

Briefly, these and other objects and advantages of the present invention are efficiently achieved by providing a decoupling arrangement that operates between an output shaft of a drive source and a power and train and that includes a manually operable latch member. In a first coupled position, the latch member cooperates with slots in a tubular member that is arranged to be rotated by the drive source. A driven member is arranged coaxially with the tubular member and pivotally carries the latch member. To accomplish decoupling, the latch member is pivoted out of the coupled position. The decoupling arrangement includes provisions to prevent decoupling movement of the latch member except when the power train is at a predetermined operative position or at one of a plurality of predetermined operative positions. The decoupling-preventing provision also serves to restrain the power train against movement when the latch member is moved out of the coupled position. In a preferred arrangement, the driven member and the tubular member each include two diametrically opposed slots and the latch member in the coupled position is received by the aligned slots thereby assuring coupling only in the predetermined synchronized relationship of the tubular member and the driven member.

BRIEF DESCRIPTION OF THE DRAWING

The invention, both as to its organization and method of operation, together with further objects and advantages thereof, will best be understood by reference to the following specification taken in conjunction with the accompanying drawing in which like reference characters refer to like elements and in which.

DETAILED DESCRIPTION

Figure 1:
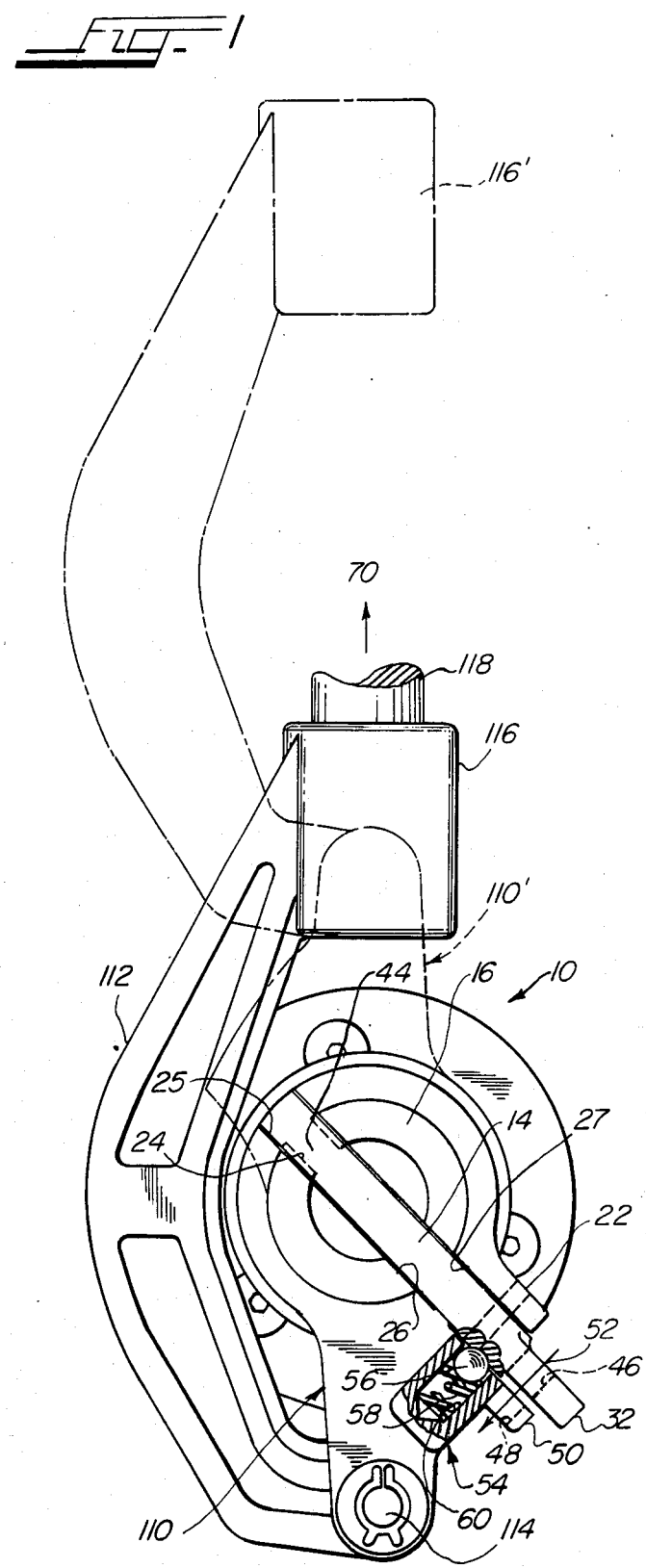
FIG. 1 is an elevational view, partly in section and with parts cut away, of the decoupling arrangement of the present invention.
Figure 2:
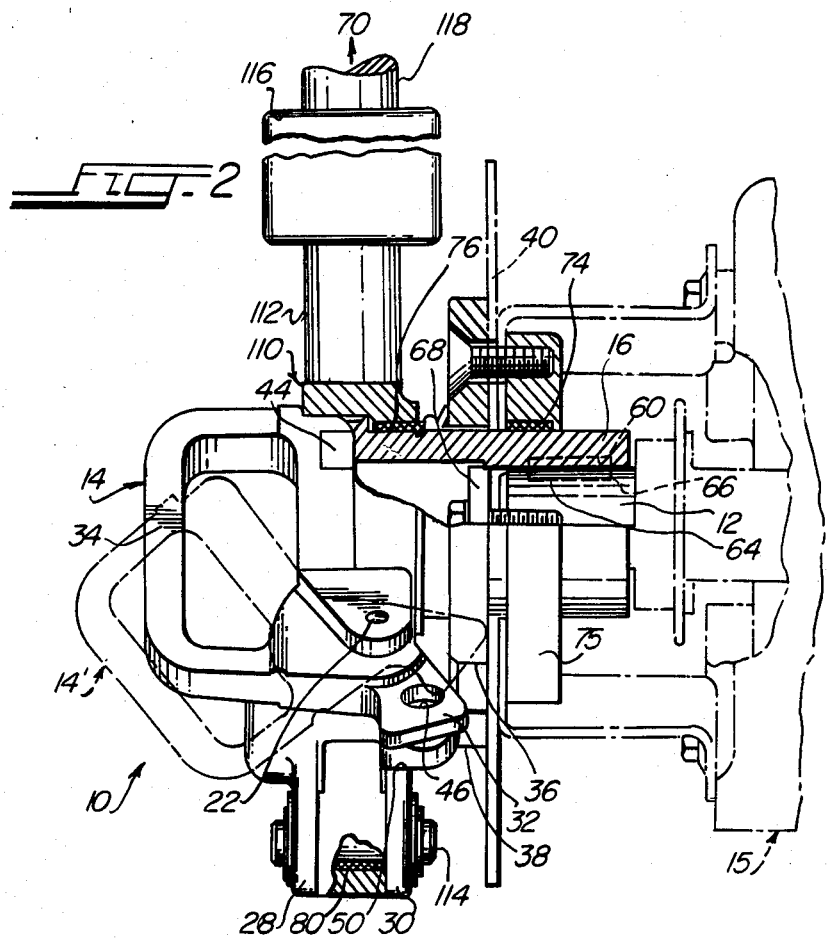
FIG. 2 is a side elevational view, partly in section and with parts cut away, of FIG. 1.

Referring now to FIGS. 1 and 2, the decoupling arrangement 10 of the present invention is illustrated for operation with an output shaft 12 of a drive source referred to generally at 15. The decoupling arrangement 10 is selectively operable via a latch 14 to decouple a power train at 70 from the output shaft 12. For example, the power train 70 in a specific example is a disconnect linkage to operate a disconnect, and the drive source 15 is an operator, all as illustrated in the aforementioned application Ser. Nos. 726,862 and 721,614. In that specific example, the operator charges an operating mechanism for the control of an interrupting unit; the disconnect being connected in series circuit with the interrupting unit. Accordingly, the operator via the output shaft 12 functions as a common drive for the charging of the operator mechanism and for the operation of the disconnect in predetermined coordinated relationship; the coordination being provided by the rotational position of the output shaft 12.

Figure 3:
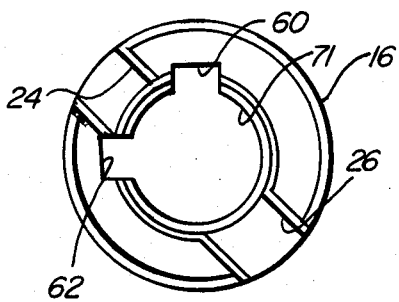
FIG. 3 is an elevational view of a portion of the decoupling arrangement of FIGS. 1 and 2 that is affixed to an output shaft of a drive source.
Figure 4:
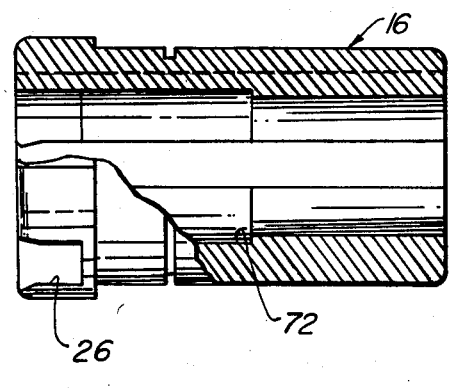
FIG. 4 is a side elevational view, partly in section and with parts cut away, of FIG. 3.

The decoupling arrangement 10 includes a tubular extension member 16 affixed to the output shaft 12. A driven member 110 encircles the extension member 16. The latch 14 is pivotally mounted with respect to the driven member 110 by a pin 22. Accordingly, the latch 14 is pivotable via a handle portion 34 between a decoupled position shown in phantom at 14' and a coupled position illustrated in FIGS. 1 and 2 to selectively couple rotation of the extension member 16 to the driven member 110. Referring now additionally to FIGS. 3 and 4, the extension member 16 includes diametrically opposed, slotted portions 24 and 26 into which the latch 14 is positioned in the coupled position. Further, as illustrated in FIG. 1, the driven member 110 includes diametrically opposed, slotted portions 25,27 for receiving the latch 14 in the coupled position. An arcuate drive-coupling member 112 is pivotally carried by the driven member 110 via a pin 114 which passes through the drive-coupling member 112 and two spaced-apart arms 28,30 of the driven member 110. The drive-coupling member 112 at an upper portion opposite the pin 114 carries a socket 116. The socket 116 receives a drive rod 118 of the power train 70. With the latch 14 in the coupled position of FIGS. 1 and 2, clockwise rotation of the output shaft 12 provides rotation of the driven member 110 and translational movement of the socket 116 in the upward direction of FIGS. 1 and 2; the phantom positions 110' and 116' of the driven member 110 and the socket 116 corresponding to approximately 180 degrees of rotation of the output shaft 12.

While the decoupling arrangement 10 is described herein as including the drive-coupling member 112, it should be realized that the member 112 can also be considered to be part of the power train 70. Further, the extension member 16 in a specific embodiment is omitted with the output shaft 12 being slotted to provide similar effects as the slots 24,26. Considering another specific embodiment, the shaft 12 is provided with a slot having a varying width versus length characteristic and the latch 14 is dimensioned for cooperation therewith. Further, in another specific embodiment, the driven member 110 is provided with one or more projections, the shaft 12 or the extension member 16 is provided with one or more projections, and the latch 14 includes receiving slots or voids for cooperation with the projections. Additionally, while a specific configuration is described wherein rotation of the output shaft 12 is converted to translational movement of the power train 70, it should also be realized that in other configurations, the driven member 110 can be utilized to provide a rotary output to a power train.

In accordance with important aspects of the present invention, the decoupling arrangement 10 is arranged to provide decoupling operation only at one predetermined position of the power train 70 and the driven member 110. To this end, the latch 14 includes an extending portion or ear 32 for cooperation with a slot 36 of a base plate 38. The base plate 38 is affixed to a portion 40 of the drive source 15. The slot 36 is located in the base plate 38 at the position corresponding to the relative position of the ear 32 at which the decoupling is to be accomplished. Accordingly, pivoting of the latch 14 is permitted at the position of FIGS. 1 and 2. Further, pivoting of the latch 14 is prevented at any other rotary location of the driven member 110 and the latch 14. For positions where the ear 32 is not aligned with the slot 36, the ear 32 will interfere with the base plate 38 to prevent any attempted pivoting of the latch 14 about the pin 22. Additionally, with the latch 14 in the decoupled position, the interference of the ear 32 with the base plate 38 prevents rotation of the driven member 110. For other specific power trains, one or more additional slots 36 are provided for defining additional decoupling positions.

In accordance with other aspects of the present invention, it can be seen that the slots 24,26 of the extension member 16, in addition to providing coupling of the driven member 110 to the extension member 16, also provide a predetermined coordinated relationship between the rotary position of the output shaft 12 and the driven member 110. Accordingly, the decoupling arrangement 10 is operable to recouple the output shaft 12 to the driven member 110 only when the output shaft 12 and the driven member 110 have been positioned relative to each other to regain the initial, predetermined alignment or synchronization. If the slots 24 and 26 in the extension member 16 are of equal widths, the latch 14 is capable of being pivoted for recoupling of the driven member 110 to the extension member 16 at two relative positions of the extension member 16 and the driven member 110. However, if the widths of the slots 24,26 are unequal, for example W1 for the slot 24 and W2 for slot 26, with W1 being less than W2, and additionally, if the latch 14 includes a narrowed portion 44 aligned with the slot 24, the latch 14 is capable of being closed for recoupling in only one predetermined relative position of the driven member 110 and the extension member 16.

To prevent unauthorized operation of the decoupling arrangement 10, the latch 14 includes a hole 46 in the ear 32 and the driven member 110 is provided with a hole 48 (FIG. 2) in an upstanding portion 50. With the driven member 110 and the latch 14 in the aligned, coupled position of FIGS. 1 and 2, the holes 46 and 48 are aligned for the passage of a shackle of a padlock or the like as represented at 52; removal of the shackle of the padlock at 52 being required before any decoupling operation can be performed.

Considering the detailed structure of the decoupling arrangement 10, the latch 14 is held in the pivoted, uncoupled position by a detent arrangement 54 (FIG. 2). The detent arrangement 54 includes a ball 56 biased by a spring 58 with the ball 56 and the spring 58 being disposed in a passage 60; the passage 60 being arranged generally perpendicularly to the handle portion 34 of the latch 14. The extension member 16 includes two keyways 60,62. The output shaft 12 includes aligned keyways, for example, a keyway 64 aligned with the keyway 60. A key 66 is inserted in the keyways 60 and 64 for the securing of the extension member 16 to the output shaft 12. Additionally, a washer 68 is secured by a fastener 70 to the output shaft 12 and abuts a shoulder 72 provided in the central opening 71 of the extension member 16. The extension member 16 is rotatably supported with respect to the drive source 15 by a bearing 74 carried by a plate 75. The driven member 110 is rotatably supported with respect to the extension member 16 by a bearing 76. The pin 114 is rotatably supported within the driven member 110 by a sleeve bearing 80.

While there has been illustrated and described various embodiments of the present invention, it will be apparent that various changes and modifications will occur to those skilled in the art. It is intended in the appended claims to cover all such changes and modifications as fall within the true spirit and scope of the present invention.

What is claimed and desired to be secured by Letter Patent of the United States is:

1. An arrangement for decoupling a power train from a drive source comprising:
   a first member arranged to be rotated by the drive source;
   a second member arranged about said first member and arranged to transmit motion to the power train;
   a third member pivotally mounted with respect to said second member, said third member in a first operative position being arranged for cooperation with said first member to couple movement of said first member to said second member, said third member decoupling said first member from said second member when moved out of said first operative position; and
   means for permitting movement of said third member only when said second member is at one or at one of a plurality of predetermined decoupling positions and for restraining movement of said second member when said third member is moved out of said first operative position, said first member including one or more slots, said second member including two slots that are aligned with said one or more slots of said first member for cooperation with said third member in said first operative position whereby said third member couples movement of said first member to said second member.

2. The arrangement of claim 1 wherein said decoupling-operation permitting and movement-restraining means comprises means carried by said third member and means located at a predetermined reference position for cooperating with said third member carried means.

3. The arrangement of claim 2 wherein said third member carried means comprises a projection and said cooperating means comprises a fourth, structural member including one or more receiving voids defined in said fourth, structural member.

4. The arrangement of claim 3 wherein said structural member is disposed about said first member and arranged to interfere with said projection of said third member when said third member is moved out of said first operative position for all positions of said second member except when said projection is aligned with one of said receiving voids.

5. The arrangement of claim 1 further comprising means for holding said third member in a decoupled position after said third member has been pivoted to said decoupled position.

6. The arrangement of claim 1 wherein said third member comprises a generally planar member having an opening forming a handle.

7. An arrangement for decoupling a power train from a drive source comprising:
   a first member arranged to be rotated by the drive source;
   a second member arranged about said first member and arranged to transmit motion to the power train;
   a third member pivotally mounted with respect to said second member, said third member in a first operative position being arranged for cooperation with said first member to couple movement of said first member to said second member, said third member decoupling said first member from said second member when moved out of said first operative position; and
   means for permitting movement of said third member only when said second member is at one or at one of a plurality of predetermined decoupling positions and for restraining movement of said second member when said third member is moved out of said first operative position, said third member including portions of at least two different widths and said first member including one or more slots that are dimensioned to interfit with said portions of said third member.

8. The arrangement of claim 7 wherein said first member includes two slots that are each dimensioned to interfit with a respective one of said different-width portions of said third member.

9. The arrangement of claim 8 wherein said first member is tubular and said two slots are diametrically opposed.

10. The arrangement of claim 9 wherein said second member includes two slots that are aligned with said two slots of said first member for cooperation with said third member in said first operative position.

* * * * *